United States Patent [19]

Arisaka

[11] Patent Number: 5,691,850
[45] Date of Patent: Nov. 25, 1997

[54] EYEPIECE

[75] Inventor: Masami Arisaka, Tokyo, Japan

[73] Assignee: Nikon Corporation, Tokyo, Japan

[21] Appl. No.: 406,161

[22] Filed: Mar. 17, 1995

[30] Foreign Application Priority Data

Mar. 25, 1994 [JP] Japan ............................... 6-077875

[51] Int. Cl.$^6$ ........................... G02B 25/00; G02B 03/02
[52] U.S. Cl. ........................................... 359/644; 359/715
[58] Field of Search ...................................... 359/643, 644, 359/708, 715, 714

[56] References Cited

U.S. PATENT DOCUMENTS

| | | | |
|---|---|---|---|
| 5,005,957 | 4/1991 | Kanamori et al. | 359/708 |
| 5,305,147 | 4/1994 | Hasegawa et al. | 359/715 |
| 5,329,401 | 7/1994 | Sato | 359/686 |
| 5,379,154 | 1/1995 | Shibayama et al. | 359/686 |

*Primary Examiner*—Georgia Y. Epps
*Assistant Examiner*—Ricky Mack
*Attorney, Agent, or Firm*—Shapiro and Shappiro

[57] ABSTRACT

An eyepiece has an apparent visual angle of 40° or more, and is constituted by, in the following order from the eyepoint side, a first lens group including a cemented lens of negative and positive lens components and having a positive refractive power, a second lens group including a single positive lens component, a third lens group including a cemented lens of positive and negative lens components and having a positive refracting power, and a fourth lens group including a single negative lens component. At least one surface in these lens groups is an aspherical surface, and the fourth-order aspherical surface coefficient of the aspherical surface satisfies $|C_4| \leq 1 \times 10^{-3}$.

8 Claims, 6 Drawing Sheets

ASPHERICAL SURFACE: $x = ay^4$

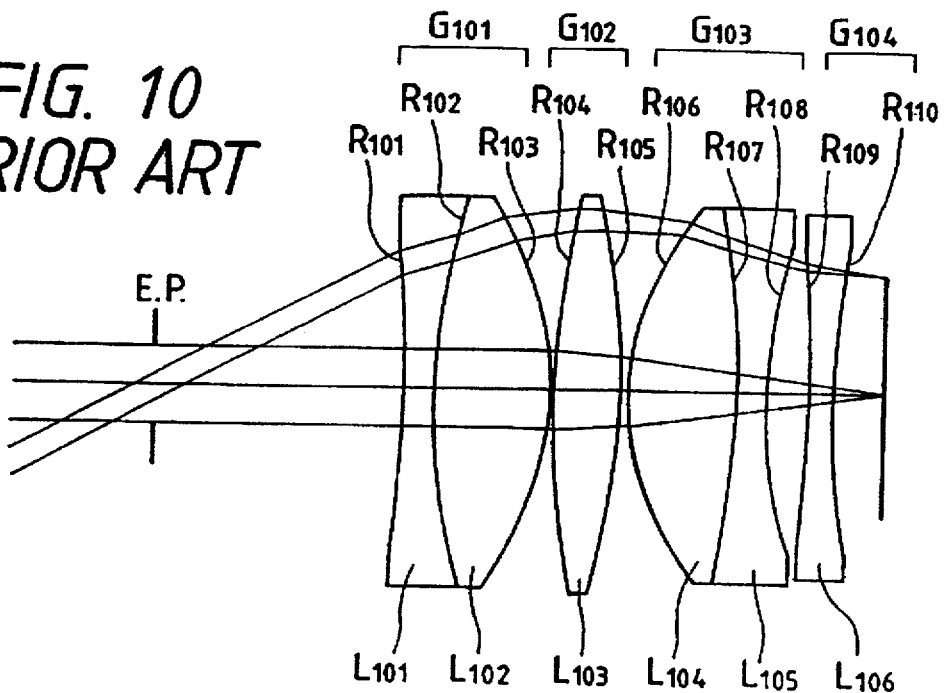
FIG. 10 PRIOR ART
FIG. 11A PRIOR ART
FIG. 11B PRIOR ART
FIG. 11C PRIOR ART
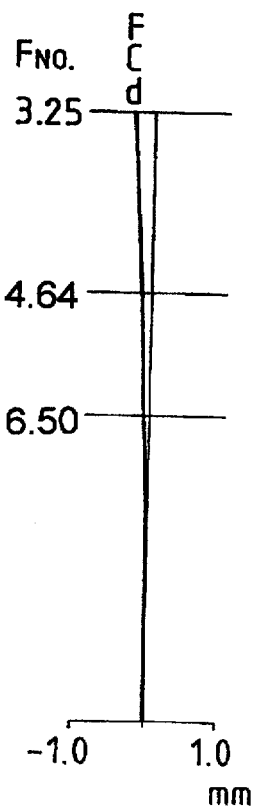
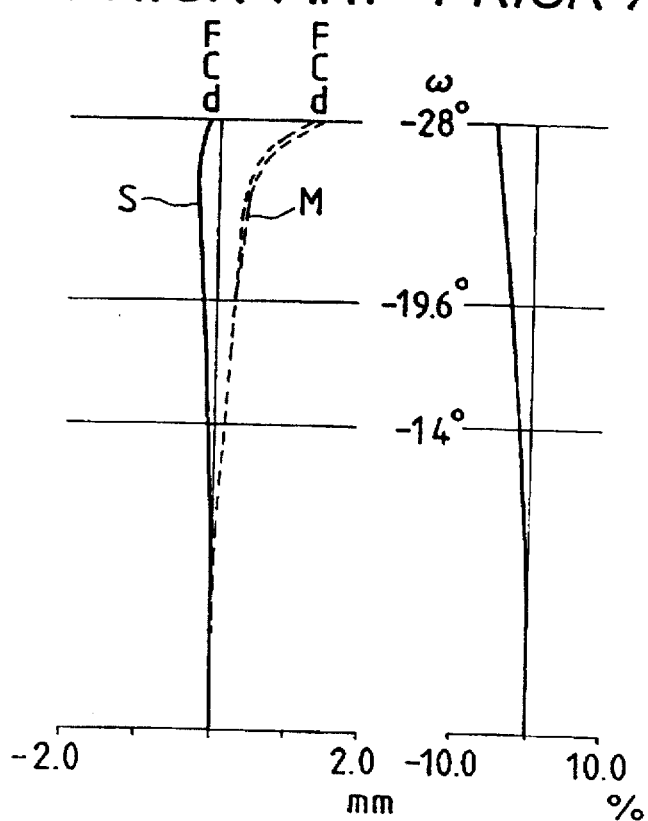

EYEPIECE

BACKGROUND OF THE INVENTION

1. Field of the Invention

The present invention relates to an eyepiece used in, e.g., a telescope, microscope, and the like and, more particularly, to an eyepiece with a wide field angle.

2. Related Background Art

Optical equipment such as a telescope, microscope, or the like normally uses an eyepiece which is used for observing a real image formed by an objective lens in a larger enlarged scale. FIG. 10 shows an example of a conventional eyepiece. FIGS. 11A to 11C show various aberrations in this eyepiece.

The eyepiece shown in FIG. 10 has a four-group/six-lens arrangement, i.e., comprises, in the following order from the eyepoint (E.P.) side, a first lens group $G_{101}$ including a cemented lens of a negative lens $L_{101}$ and a positive lens $L_{102}$ and having a positive refractive power, a second lens group $G_{102}$ including a single positive lens component $L_{103}$, a third lens group $G_{103}$ including a cemented lens of a positive lens $L_{104}$ and a negative lens $L_{105}$ and having a positive refractive power, and a fourth lens group $G_{104}$ including a single negative lens component $L_{106}$. This eyepiece has a focal length f=16.25 mm, an apparent visual angle=56°, and an eye relief=16.4 mm. Note that the parameter values of this eyepiece are summarized in Table 1 below. In Table 1, $r_i$ is the radius of curvature of a lens surface $R_i$, $d_i$ is the surface interval on the optical axis between lens surfaces $R_i$ and $R_{i+1}$, $n_i$ is the refractive index for the d-line of a medium between lens surfaces $R_i$ and $R_{i+1}$, and $v_i$ is the Abbe's number of a medium between lens surfaces $R_i$ and $R_{i+1}$.

TABLE 1

| $R_i$ | $r_i$ | $d_i$ | $n_i$ | $v_i$ |
|---|---|---|---|---|
| $R_{101}$ | −107.0 | 2.0 | 1.805 | 25.5 |
| $R_{102}$ | 40.0 | 8.0 | 1.713 | 53.9 |
| $R_{103}$ | −20.8 | 0.2 | | |
| $R_{104}$ | 56.0 | 5.0 | 1.491 | 57.6 |
| $R_{105}$ | −39.4 | 0.2 | | |
| $R_{106}$ | 17.8 | 7.5 | 1.620 | 60.4 |
| $R_{107}$ | −66.2 | 2.0 | 1.805 | 25.5 |
| $R_{108}$ | 32.8 | 3.0 | | |
| $R_{109}$ | −100.0 | 1.5 | 1.713 | 53.9 |
| $R_{110}$ | 56.0 | | | |

However, it is difficult for the conventional eyepiece with a wide field angle to achieve sufficient aberration correction up to the peripheral portion of the field of view, in particular, to correct distortion, and the like.

SUMMARY OF THE INVENTION

The present invention has been made in consideration of the conventional problems, and has as its principal object to obtain an eyepiece with good imaging performance. In particular, it is another object of the present invention to provide optimal conditions of an aspherical surface for such an eyepiece. It is still another object of the present invention to provide an eyepiece in which various aberrations are satisfactorily corrected by appropriately selecting these conditions.

In order to achieve the above objects, an eyepiece according to a first aspect of the invention, which has an apparent visual angle of 40° or more, comprises, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, and at least one surface in these lens groups is an aspherical surface whose peripheral portion has a radius of curvature larger than that near its vertex.

In the eyepiece according to a second aspect of the invention, the aspherical surface satisfies formulas (1) and (2) below in the eyepiece described in regard to the first aspect of the invention:

$$x = C_0 y^2 / [1 + \sqrt{(1 - \kappa C_0^2 y^2)}\,] + C_4 y^4 + C_6 y^6 + C_8 y^8 + C_{10} y^{10} \quad (1)$$

$$|C_4| \leq 1 \times 10^{-3} \quad (2)$$

where x is the distance measured from the vertex in the optical axis direction, y is the distance measured from the vertex in a direction perpendicular to the optical axis, $C_0 = 1/R$ (the radius of curvature at the vertex) is the vertex curvature, $\kappa$ is a constant of cone, and $C_4$, $C_6$, $C_8$, and $C_{10}$ are respectively 4th-, 6th-, 8th-, and 10th-order aspherical surface coefficients.

In the eyepiece according to a third aspect of the invention, the aspherical surface coefficient $C_4$ satisfies formula (3) below in the eyepiece described in regard to the second aspect of the invention:

$$1 \times 10^{-7} < |C_4| < 1 \times 10^{-3} \quad (3)$$

An eyepiece according to a fourth aspect of the invention, which has an apparent visual angle of 40° or more, comprises, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, at least one surface of the lens components having a positive refractive power in these lens groups is an aspherical surface, and the aspherical surface satisfies formula (4) below:

$$5 \times 10^{-3} < |dx/h| < 5 \times 10^{-2} \quad (4)$$

where dx is the displacement amount from the incident position of a principal ray with a maximum incident height onto the aspherical surface to the incident position onto an imaginary reference spherical surface, which is measured in the optical axis direction, and h is the distance from the optical axis of the incident position of the principal ray with the maximum incident height.

Furthermore, an eyepiece according to a fifth aspect of the invention, which has an apparent visual angle of 40° or more, comprises, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, at least one surface of the lens components having a negative refractive power in these lens groups is an aspherical surface, and the aspherical surface satisfies formula (5) below:

$$5\times10^{-4} < |dx/h| < 5\times10^{-2} \quad (5)$$

where dx is the displacement amount from the incident position of a principal ray with a maximum incident height onto the aspherical surface to the incident position onto an imaginary reference spherical surface, which is measured in the optical axis direction, and h is the distance from the optical axis of the incident position of the principal ray with the maximum incident height.

In the eyepiece according to a sixth aspect of the invention, at least one of a lens surface on the eyepoint side and a lens surface on the object side of the positive lens component in the second lens group is the aspherical surface, and satisfies formula (6) below in the eyepiece described in regard to the first or fourth aspect of the invention:

$$-1 < S_1 < 0 \quad (6)$$

for $S_1 = (r_b + r_a)/(r_b - r_a)$ where $r_a$ is the radius of curvature at the vertex of the lens surface on the eyepoint side, and $r_b$ is the radius of curvature at the vertex of the lens surface on the object side.

In the eyepiece according to a seventh aspect of the invention, at least one of a lens surface on the eyepoint side and a lens surface on the object side of the negative lens component in the fourth lens group is the aspherical surface, and satisfies formula (7) below in the eyepiece described in regard to the first or fifth aspect of the invention:

$$-1 < S_2 < 1 \quad (7)$$

for $S_2 = (r_d + r_c)/(r_d - r_c)$ where $r_c$ is the radius of curvature at the vertex of the lens surface on the eyepoint side, and $r_d$ is the radius of curvature at the vertex of the lens surface on the object side. It is more preferable that the lower limit of formula (7) be zero, namely, $0 < S_2 < 1$.

The first aspect of the present invention is directed to an eyepiece having an apparent visual angle, comprising, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, wherein at least one surface in these lens groups is an aspherical surface whose peripheral portion has a radius of curvature larger than that near its vertex.

At a wide field angle of 40° or more, the Petzval sum must be reduced to decrease the curvature of field so as to assure the flatness of the image plane. However, in the present invention, the negative lens component is arranged in the fourth lens group with respect to the first, second, and third lens groups having a positive refractive power, thereby reducing the Petzval sum. Furthermore, aberrations in the entire eyepiece can be corrected with good balance by the above-mentioned arrangement, i.e., the cemented lens in the first lens group, the positive lens in the second lens group, and the cemented lens in the third lens group, and when at least one surface in these lens groups is formed to be an aspherical surface, distortion can be especially satisfactorily corrected.

A case will be examined below wherein a correction plate is added to the eyepiece, and distortion is corrected by forming an aspherical surface on the correction plate. As shown in FIG. 9A, a correction plate $L_c$ having an aspherical surface shape is inserted between a front-side focal plane F of an eyepiece Le including spherical lenses, and the eyepiece Le, and the distortion of the eyepiece is corrected by the correction plate $L_c$.

Assume that, as shown in FIG. 9B, the shape of the correction plate $L_c$ is expressed by the following formula using q as a constant:

$$x = qy^4 \quad (8)$$

An angle θ of a tangent is obtained by differentiating formula (8) as follows:

$$\theta = 4qy^3$$

If the refractive index of the correction plate $L_c$ is represented by n, the angle of a ray R of light after it is transmitted through the aspherical surface is θ', and the angle of deflection of the light ray by the aspherical surface is δ, δ is given by:

$$\delta = \theta' - \theta = (1 - 1/n)\theta = 4(1 - 1/n)qy^3 \quad (9)$$

On the other hand, a distortion ΔS' caused by the eyepiece Le is expressed as follows in a region of the third-order aberration using A as a constant:

$$\Delta S' = Ay^2 \quad (10)$$

where y is the height of a light ray incident on the eyepiece Le. If the imaging magnification of a pupil of the eyepiece Le is represented by β, ΔS' can also be expressed as follows:

$$\Delta S' = -\beta^2 \Delta S \quad (11)$$

If a distance S to the entrance pupil is sufficiently larger than the focal length of the eyepiece Le, the following formula holds based on the sine theorem:

$$\Delta S = -S^2 \delta/y = -4(1-1/n)qS^2y^2 \quad (12)$$

Substitution of formula (12) into formula (11) yields:

$$A = 4(1-1/n)\beta^2 qS^2 \quad (13)$$

As can be seen from a comparison between formulas (10) and (13), formula (10) coincides with formula (11).

If q satisfying formula (13) is given, an eyepiece free from distortion as a whole can be obtained. Formula (8) is rewritten as:

$$x = qy^4 = A/[4(1-1/n)\beta^2 S^2] y^4 \quad (14)$$

If the eye relief is represented by S', since β=S'/S, then, the above formula is rewritten as:

$$x = A/4(1-1/n)S'^2 \cdot y^4 \quad (15)$$

The above-mentioned q corresponds to a coefficient $C_4$ of $y^4$ in the following general formula representing an aspherical surface:

$$x = C_0 y^2/[1 + \sqrt{(1-\kappa C_0^2 y^2)}] + C_4 y^4 + C_6 y^6 + C_8 y^8 + C_{10} y^{10}$$

where x is the distance measured from the vertex in the optical axis direction, y is the distance measured from the vertex in a direction perpendicular to the optical axis, $C_0 = 1/R$ (R: the radius of curvature at the vertex) is the vertex curvature, $\kappa$ is a constant of cone, and $C_4$, $C_6$, $C_8$, and $C_{10}$ are respectively 4th-, 6th-, 8th-, and 10th-order aspherical surface coefficients.

S' in formula (15) can be assumed to be about 10 to 30 mm since it is the eye relief of the eyepiece. Although A varies depending on the arrangement, entrance pupil position, focal length, and the like of the eyepiece, if $C_4$ satisfies conditional formula (2) above, the distortion can be corrected for A of a general eyepiece.

In the third aspect of invention, the aspherical surface coefficient $C_4$ satisfies conditional formula (3) above. Thus, not only distortion, but also astigmatism can be satisfactorily corrected. When $C_4$ is smaller than the lower limit of this conditional formula, distortion cannot be sufficiently corrected; when $C_4$ exceeds the upper limit, distortion is excessively corrected.

A case will be examined below wherein the vertex curvature $C_0$ is not 0, i.e., the coefficient of the term of $y^2$ is not 0. Assume that the aspherical surface shape is expressed by formula (16) below:

$$x = py^2 + qy^4 \quad (16)$$

As in the above description, the angle $\theta$ of the tangent and the distortion $\Delta S'$ can be calculated as follows:

$$\theta = 2py + 4qy^3$$

$$\Delta S' = 2(1-1/n)\beta^2 p S'^2 + (1-1/n)\beta^2 q S'^2 y^2$$

The second term in this formula is the same as that in the formula obtained when the vertex curvature $C_0$ is 0. The second term is a constant term without $y^2$, i.e., a term representing the movement of the image point by the surface of the vertex curvature $C_0$, and is not associated with the correction of distortion. Therefore, even when the shape of the correction plate includes a term corresponding to the term of $y^2$ (quadrics), in other words, even when the correction plate is a lens with a refractive power, since only the term of $y^4$ influences the correction of distortion, distortion can be satisfactorily corrected as long as the value $C_4$ satisfies the above-mentioned conditional formula.

Note that only the term of $y^4$ has been described in association with the shape of the correction plate $L_c$ since distortion is perfectly corrected by only the term of $y^4$ in the region of the third-order aberration. However, as the field angle of the eyepiece becomes wider, the distortion deviates from the region of the third-order aberration. For this reason, the above-mentioned aspherical surface correction plate expressed by only the term of $y^4$ cannot perfectly correct the distortion any longer. In this case, a higher-order correction term can be added to the aspherical surface shape of the correction plate $L_c$ in addition to the above-mentioned term of $y^4$.

The fourth aspect of the present invention is directed to an eyepiece, which has an apparent visual angle of 40° or more, comprising, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, wherein when at least one surface of the lens components having a positive refractive power in these lens groups is an aspherical surface, the aspherical surface satisfies formula (4) above.

In the above-mentioned lens group arrangement, when the lens component having a positive refractive power has an aspherical surface, if conditional formula (4) is not satisfied, the effect of the aspherical surface becomes insufficient, and the distortion cannot be satisfactorily corrected. More specifically, when |dx/h| is smaller than the lower limit of conditional formula (4), the positive distortion generated in a spherical surface system cannot be sufficiently canceled by the negative distortion generated in an aspherical surface portion, and the meridional image surface cannot be generated. On the contrary, when |dx/h| exceeds the upper limit of conditional formula (4), the negative distortion generated in the aspherical surface is too large to cancel the positive distortion generated in the spherical surface system. In particular, the meridional image surface cannot be sufficiently corrected. When |dx/h| exceeds the upper limit, although the sagittal image surface is considerably worsened, it can be canceled by an objective lens, a zoom system of a stereomicroscope, or the like, and a flat image surface can be obtained as a whole. For this reason, no serious problem is posed in association with the sagittal image surface.

The fifth aspect of the present invention is directed to an eyepiece, which has an apparent visual angle of 40° or more, comprising, in the following order from the eyepoint side, a first lens group including a cemented lens of negative and positive lens components and having a positive refractive power, a second lens group including a single positive lens component, a third lens group including a cemented lens of positive and negative lens components and having a positive refractive power, and a fourth lens group including a single negative lens component, wherein when at least one surface of the lens components having a negative refractive power in these lens groups is an aspherical surface, the aspherical surface satisfies formula (5) above.

In the above-mentioned lens group arrangement, when the lens component having a negative refractive power has an aspherical surface, if conditional formula (5) is not satisfied, the effect of the aspherical surface becomes insufficient, and the distortion cannot be satisfactorily corrected. More specifically, when |dx/h| is smaller than the lower limit of conditional formula (5), the positive distortion generated in a spherical surface system cannot be sufficiently canceled by the negative distortion generated in an aspherical surface portion, and the meridional image surface cannot be generated. On the contrary, when |dx/h| exceeds the upper limit of conditional formula (5), the negative distortion generated in the aspherical surface is too large to cancel the positive distortion generated in the spherical surface system. In particular, the meridional image surface cannot be sufficiently corrected. When |dx/h| exceeds the upper limit, although the sagittal image surface is considerably worsened, it can be canceled by an objective lens, a zoom system of a stereomicroscope, or the like, and a flat image surface can be obtained as a whole. For this reason, no serious problem is posed in association with the sagittal image surface.

In the sixth aspect of the present invention, the aspherical surface is used as at least one of the lens surface on the eyepoint side and the lens surface on the object side of the positive lens component of the second lens group, and satisfies conditional formula (6) above. This condition defines the shape of the positive lens component of the second lens group. When $S_1$ exceeds the upper limit of conditional formula (6), astigmatism and distortion increase; when $S_1$ is smaller than the lower limit of conditional formula (6), astigmatism and distortion increase, and also, coma increases. When one surface of the positive lens component of the second lens group is formed as the aspherical surface, since the second lens group includes a single lens, a high-precision aspherical surface can be provided without causing a manufacturing error caused by cemented surfaces or the like unlike in a case wherein one of lens surfaces of the first or third lens group is formed as the aspherical surface.

In the seventh aspect of the present invention, the aspherical surface is used as at least one of the lens surface on the eyepoint side and the lens surface on the object side of the negative lens component of the fourth lens group, and satisfies conditional formula (7) above. This condition defines the shape of the negative lens component of the fourth lens group. When $S_1$ exceeds the upper limit of conditional formula (7), astigmatism, distortion, and coma increase; when $S_1$ is smaller than the lower limit of conditional formula (6), astigmatism and distortion increase. When one surface of the negative lens component of the fourth lens group is formed as the aspherical surface, since the fourth lens group includes a single lens, a high-precision aspherical surface can be provided without causing a manufacturing error caused by cemented surfaces or the like unlike in a case wherein one of lens surfaces of the first or third lens group is formed as the aspherical surface.

BRIEF DESCRIPTION OF THE DRAWINGS

FIGS. 2A to 2C are graphs showing various aberrations of the eyepiece shown in FIG. 1, in which FIG. 2A shows a spherical aberration curve, FIG. 2B shows an astigmatism curve, and FIG. 2C shows a distortion curve;

FIGS. 4A to 4C are graphs showing various aberrations of the eyepiece shown in FIG. 3, in which FIG. 4A shows a spherical aberration curve, FIG. 4B shows an astigmatism curve, and FIG. 4C shows a distortion curve;

FIGS. 6A to 6C are graphs showing various aberrations of the eyepiece shown in FIG. 5, in which FIG. 6A shows a spherical aberration curve, FIG. 6B shows an astigmatism curve, and FIG. 6C shows a distortion curve;

FIGS. 8A to 8C are graphs showing various aberrations of the eyepiece shown in FIG. 7, in which FIG. 8A shows a spherical aberration curve, FIG. 8B shows an astigmatism curve, and FIG. 8C shows a distortion curve;

FIGS. 9A and 9B are explanatory views for explaining the effect of the present invention, in which FIG. 9A is a schematic view showing the arrangement of an eyepiece, and FIG. 9B is a graph showing the aspherical surface shape of a correction plate $L_c$ of the eyepiece shown in FIG. 9A;

FIG. 10 is a schematic view showing the arrangement of a conventional eyepiece; and FIGS. 11A to 11C are graphs showing various aberrations of the eyepiece shown in FIG. 10, in which FIG. 11A shows a spherical aberration curve, FIG. 11B shows an astigmatism curve, and FIG. 11C shows a distortion curve.

DETAILED DESCRIPTION OF THE PREFERRED EMBODIMENTS

The preferred embodiments of the present invention will be described hereinafter.

(First Embodiment)

Figure 1:
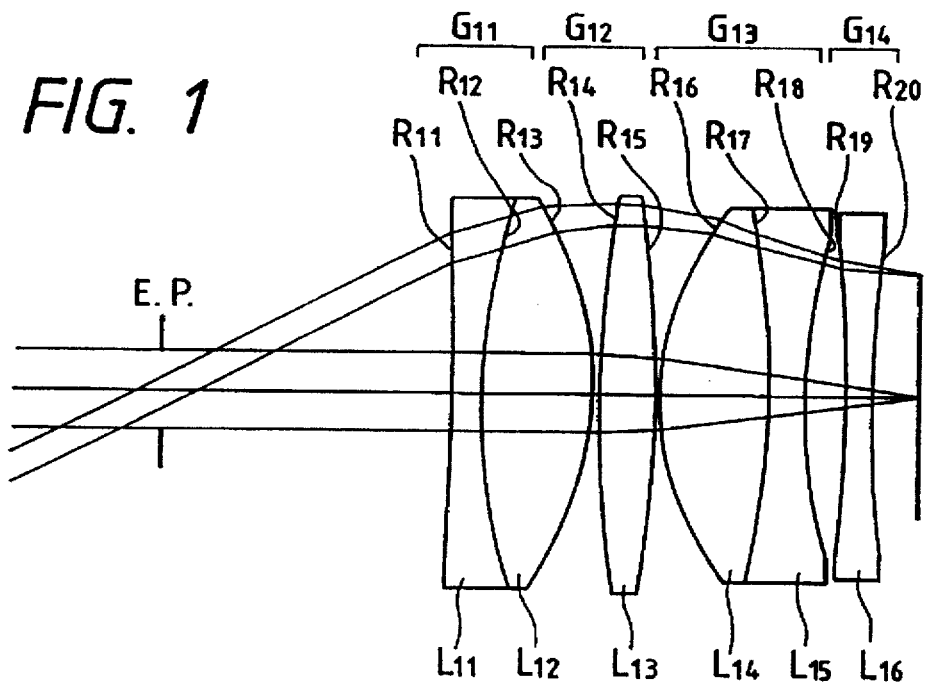
FIG. 1 is a schematic view showing the arrangement of an eyepiece according to a first embodiment of the present invention.

As the first embodiment of the present invention, FIG. 1 shows an eyepiece which has an apparent visual angle of 56°, and has a four-group/six-lens arrangement comprising, in the following order from the eyepoint (E.P.) side, a first lens group $G_{13}$ including a cemented lens of a negative lens $L_{11}$ and a positive lens $L_{12}$ and having a positive refractive power, a second lens group $G_{12}$ including a single positive lens component $L_{13}$, a third lens group $G_{13}$ including a cemented lens of a positive lens $L_{14}$ and a negative lens $L_{15}$ and having a positive refractive power, and a fourth lens group $G_{14}$ including a single negative lens component $L_{16}$. In this embodiment, the lens material of the positive lens $L_{13}$ in the second lens group $G_{12}$ is optical glass, and a lens surface $R_{15}$ on the object side is an aspherical surface which is expressed by formula (1) above and satisfies conditional formulas (3), (4), and (6) above.

Table 2 below shows the parameter values of the eyepiece of this embodiment. In Table 2, $r_i$ is the radius of curvature of a lens surface $R_i$, $d_i$ is the surface interval on the optical axis between lens surfaces $R_i$ and $R_{i+1}$, $n_i$ is the refractive index for the d-line of a medium between lens surfaces $R_i$ and $R_{i+1}$, and $v_i$ is the Abbe's number of a medium between lens surfaces $R_i$ and $R_{i+1}$. Table 2 also shows the aspherical surface coefficients $C_4$, $C_6$, $C_8$, and $C_{10}$, and $\kappa$.

TABLE 2

| $R_i$ | $r_i$ | $d_i$ | $n_i$ | $v_i$ |
|---|---|---|---|---|
| $R_{11}$ | −270.2 | 2.0 | 1.805 | 25.5 |
| $R_{12}$ | 40.0 | 8.0 | 1.713 | 53.9 |
| $R_{13}$ | −20.8 | 0.2 | | |
| $R_{14}$ | 75.0 | 4.0 | 1.713 | 53.9 |
| $R_{15}$ | −65.0 | 0.2 | | |
| $R_{16}$ | 19.2 | 7.5 | 1.620 | 60.4 |
| $R_{17}$ | −50.0 | 2.0 | 1.805 | 25.5 |
| $R_{18}$ | 32.8 | 3.0 | | |
| $R_{19}$ | −100.0 | 1.5 | 1.713 | 53.9 |
| $R_{20}$ | 56.0 | | | |

$R_{15}$: aspherical surface $\kappa = -2.41$ $C_4 = 0.20 \times 10^{-5}$ $C_6 = 0.18 \times 10^{-8}$ $C_8 = -0.48 \times 10^{-11}$ $C_{10} = 0.40 \times 10^{-12}$ $S_1 = -0.071$ $|dx/h| = 0.0277$ In this embodiment, the synthesized focal length of the four lens groups is f=16.25 mm, the value $|dx/h|$ corresponding to conditional formula (4) and the value $S_1$ corresponding to conditional formula (6) are as shown in Table 2 above.

Figure 2A:
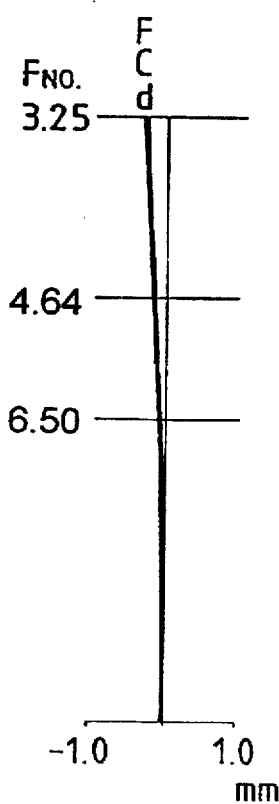
Figures 2B, 2C:
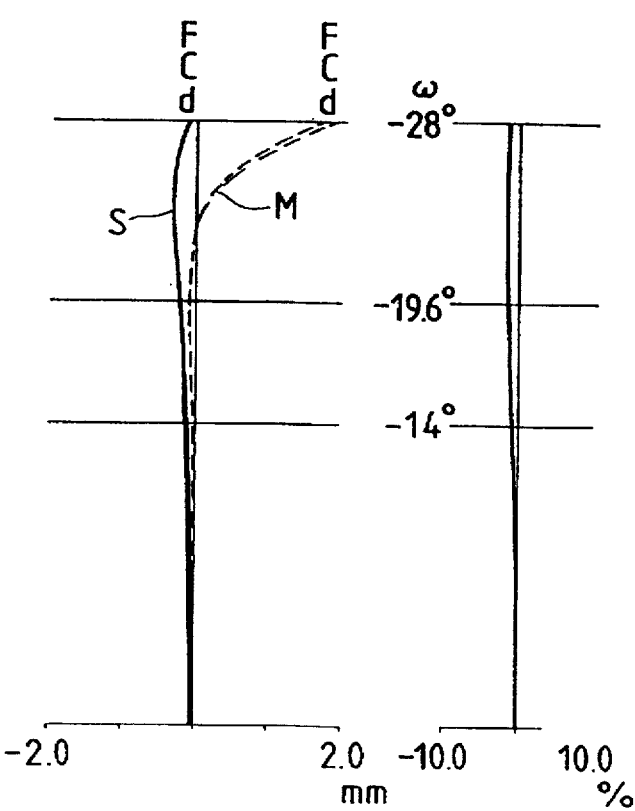

Various aberrations of the eyepiece of this embodiment: spherical aberration (the ordinate represents the f-number), astigmatism (the ordinate represents the incident angle (ω)), and distortion (the ordinate represents the incident angle (ω)) are as shown in FIGS. 2A to 2C. The eye relief of this eyepiece is 19.5 mm, and is prolonged by about 20% as compared to the conventional eyepiece (FIG. 10) in which the eye relief is substantially equal to the synthesized focal length. As is apparent from FIGS. 2A to 2C, in the eyepiece of this embodiment, the distortion is especially greatly improved as compared to the conventional eyepiece using no aspherical surface.

(Second Embodiment)

Figure 3:
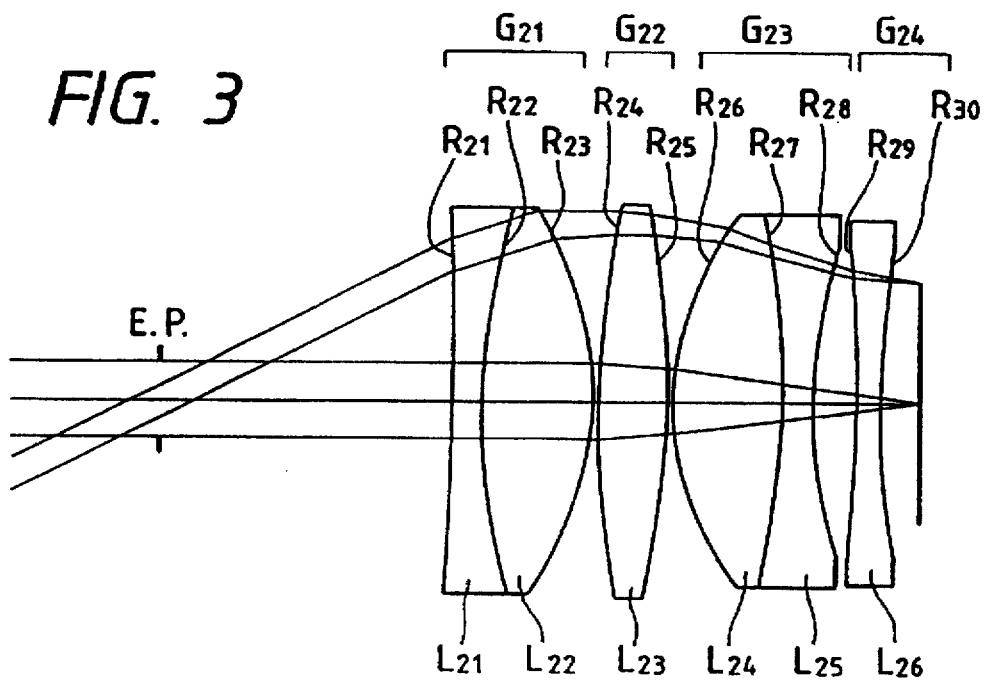
FIG. 3 is a schematic view showing the arrangement of an eyepiece according to the second embodiment of the present invention.

As the second embodiment of the present invention, FIG. 3 shows an eyepiece which has an apparent visual angle of 56°, and has a four-group/six-lens arrangement comprising, in the following order from the eyepoint (E.P.) side, a first lens group $G_{21}$ including a cemented lens of a negative lens $L_{21}$ and a positive lens $L_{22}$ and having a positive refractive power, a second lens group $G_{22}$ including a single positive lens component $L_{23}$, a third lens group $G_{23}$ including a cemented lens of a positive lens $L_{24}$ and a negative lens $L_{25}$ and having a positive refractive power, and a fourth lens group $G_{24}$ including a single negative lens component $L_{26}$. In this embodiment, the lens material of the positive lens $L_{23}$ in the second lens group $G_{22}$ is a resin optical material, and a lens surface $R_{25}$ on the object side is an aspherical surface which is expressed by formula (1) above and satisfies conditional formulas (3), (4), and (6) above.

Table 3 below shows the parameter values of the eyepiece of this embodiment. In Table 3, $r_i$ is the radius of curvature of a lens surface $R_i$, $d_i$ is the surface interval on the optical axis between lens surfaces $R_i$ and $R_{i+1}$, $n_i$ is the refractive index for the d-line of a medium between lens surfaces $R_i$ and $R_{i+1}$, and $v_i$ is the Abbe's number of a medium between lens surfaces $R_i$ and $R_{i+1}$. Table 3 also shows the aspherical surface coefficients $C_4$, $C_6$, $C_8$, and $C_{10}$, and κ.

TABLE 3

| $R_i$ | $r_i$ | $d_i$ | $n_i$ | $v_i$ |
|---|---|---|---|---|
| $R_{21}$ | −387.2 | 2.0 | 1.805 | 25.5 |
| $R_{22}$ | 40.0 | 8.0 | 1.713 | 53.9 |
| $R_{23}$ | −20.8 | 0.2 | | |
| $R_{24}$ | 56.0 | 5.0 | 1.491 | 57.6 |
| $R_{25}$ | −43.8 | 0.2 | | |
| $R_{26}$ | 19.1 | 7.5 | 1.620 | 60.4 |
| $R_{27}$ | −50.0 | 2.0 | 1.805 | 25.5 |
| $R_{28}$ | 32.8 | 3.0 | | |
| $R_{29}$ | −100.0 | 1.5 | 1.713 | 53.9 |
| $R_{30}$ | 56.0 | | | |

$R_{25}$: aspherical surface
κ=−7.35
$C_4=0.20\times10^{-5}$
$C_6=-0.64\times10^{-8}$
$C_8=0$
$C_{10}=0.82\times10^{-12}$
$S_1=-0.122$
|dx/h|=0.0101

Figure 4A:
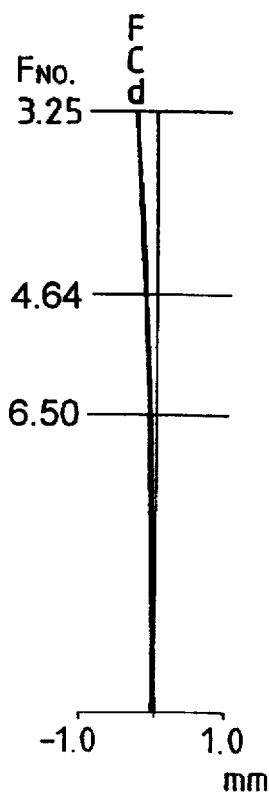
Figures 4B, 4C:
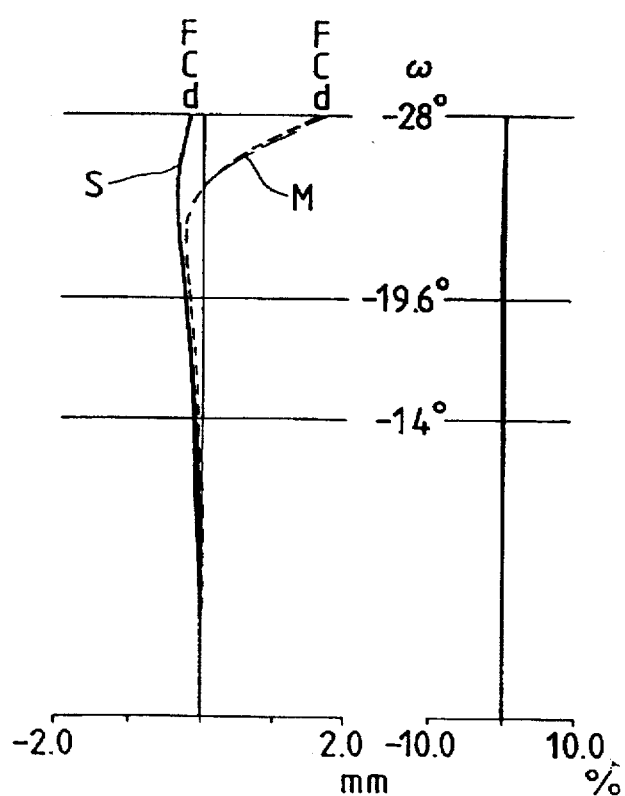

In this embodiment, the synthesized focal length of the four lens groups is f=16.25 mm, the value |dx/h| corresponding to conditional formula (4) and the value $S_1$ corresponding to conditional formula (6) are as shown in Table 3 above. Various aberrations of the eyepiece of this embodiment (the same aberration curves as in FIGS. 2A to 2C) are as shown in FIGS. 4A to 4C. The eye relief of this eyepiece is 20.0 mm, and is prolonged by about 20% as compared to the conventional eyepiece (FIG. 10) in which the eye relief is substantially equal to the synthesized focal length. As is apparent from FIGS. 4A to 4C, in the eyepiece of this embodiment, the distortion is especially greatly improved as compared to a conventional eyepiece using no aspherical surface.

(Third Embodiment)

Figure 5:
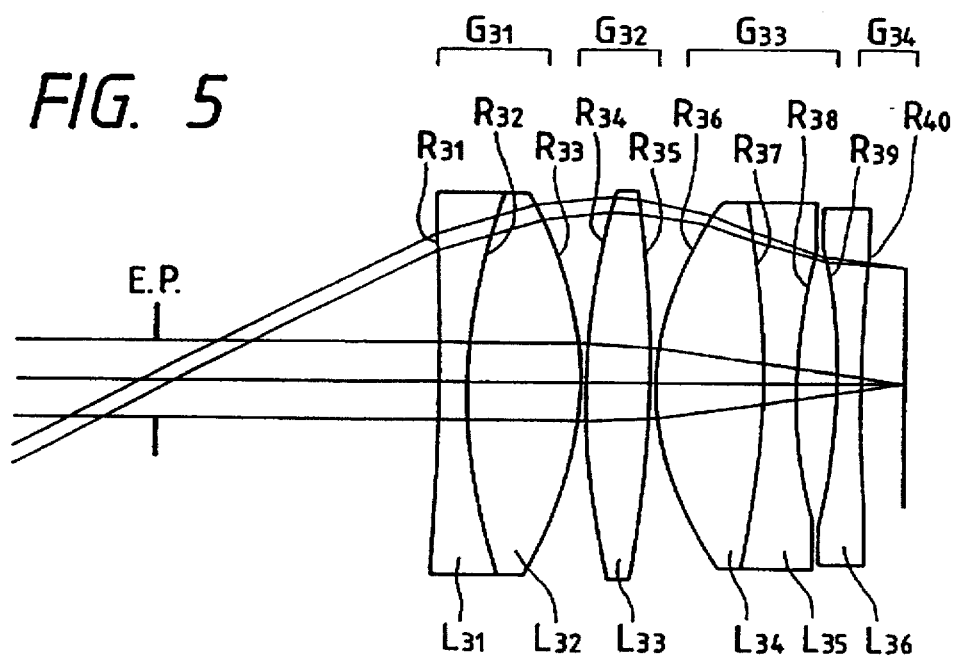
FIG. 5 is a schematic view showing the arrangement of an eyepiece according to a third embodiment of the present invention.

As the third embodiment of the present invention, FIG. 5 shows an eyepiece which has an apparent visual angle of 56°, and has a four-group/six-lens arrangement comprising, in the following order from the eyepoint (E.P.) side, a first lens group $G_{31}$ including a cemented lens of a negative lens $L_{31}$ and a positive lens $L_{32}$ and having a positive refractive power, a second lens group $G_{32}$ including a single positive lens component $L_{33}$, a third lens group $G_{33}$ including a cemented lens of a positive lens $L_{34}$ and a negative lens $L_{35}$ and having a positive refractive power, and a fourth lens group $G_{34}$ including a single negative lens component $L_{36}$. In this embodiment, the lens material of the negative lens $L_{36}$ in the fourth lens group $G_{34}$ is optical glass, and a lens surface $R_{40}$ on the object side is an aspherical surface which is expressed by formula (1) above and satisfies conditional formulas (3), (5), and (7) above.

Table 4 below shows the parameter values of the eyepiece of this embodiment. In Table 4, $r_i$ is the radius of curvature of a lens surface $R_i$, $d_i$ is the surface interval on the optical axis between lens surfaces $R_i$ and $R_{i+1}$, $n_i$ is the refractive index for the d-line of a medium between lens surfaces $R_i$ and $R_{i+1}$, and $v_i$ is the Abbe's number of a medium between lens surfaces $R_i$ and $R_{i+1}$. Table 4 also shows the aspherical surface coefficients $C_4$, $C_6$, $C_8$, and $C_{10}$, and κ.

TABLE 4

| $R_i$ | $r_i$ | $d_i$ | $n_i$ | $v_i$ |
|---|---|---|---|---|
| $R_{31}$ | −227.3 | 2.0 | 1.805 | 25.5 |
| $R_{32}$ | 36.7 | 8.0 | 1.713 | 53.9 |
| $R_{33}$ | −22.2 | 0.2 | | |
| $R_{34}$ | 50.0 | 4.5 | 1.713 | 53.9 |
| $R_{35}$ | −70.0 | 0.2 | | |
| $R_{36}$ | 19.2 | 7.5 | 1.620 | 60.4 |
| $R_{37}$ | −54.0 | 2.0 | 1.805 | 25.5 |
| $R_{38}$ | 32.8 | 3.0 | | |
| $R_{39}$ | −36.3 | 1.5 | 1.713 | 53.9 |
| $R_{40}$ | 100.0 | | | |

$R_{40}$: aspherical surface
κ=−5.00
$C_4=0.23\times10^{-5}$
$C_6=0.42\times10^{-7}$
$C_8=0.13\times10^{-8}$
$C_{10}=-0.29\times10^{-10}$
$S_2=0.467$
|dx/h|=0.0050

Figures 6A, 6B, 6C:
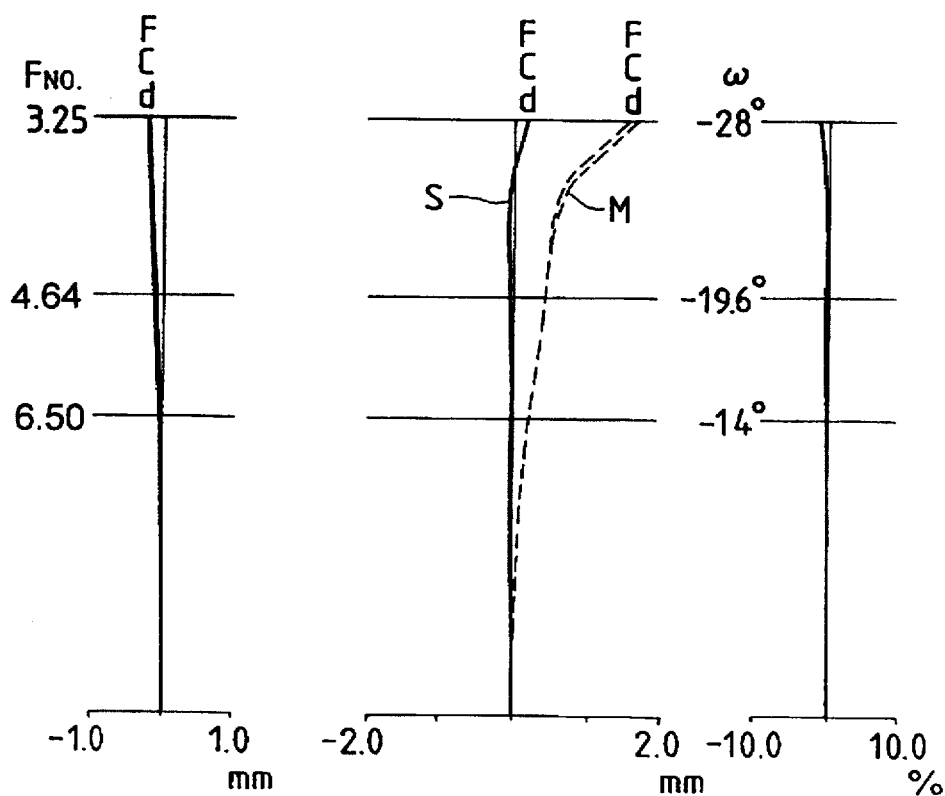

In this embodiment, the synthesized focal length of the four lens groups is f=16.25 mm, the value |dx/h| corresponding to conditional formula (5) and the value $S_2$ corresponding to conditional formula (7) are as shown in Table 4 above. Various aberrations of the eyepiece of this embodiment (the same aberration curves as in FIGS. 2A to 2C) are as shown in FIGS. 6A to 6C. The eye relief of this eyepiece is 19.3 mm, and is prolonged by about 20% as compared to the conventional eyepiece (FIG. 10) in which the eye relief is substantially equal to the synthesized focal length. As is apparent from FIGS. 6A to 6C, in the eyepiece of this embodiment, the distortion is especially greatly improved as compared to a conventional eyepiece using no aspherical surface.

(Fourth Embodiment)

Figure 7:
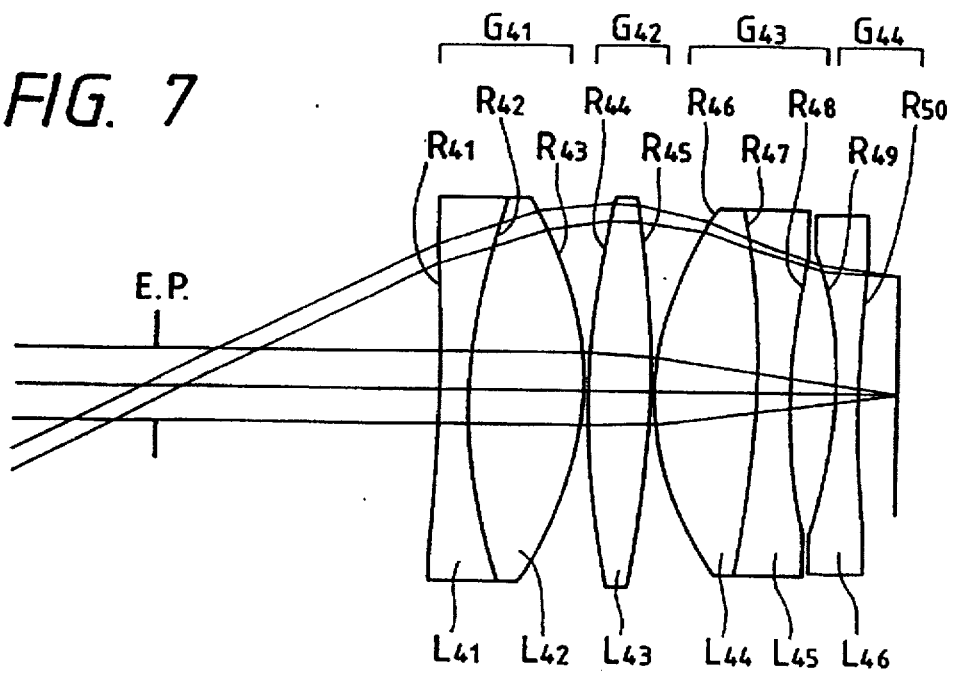
FIG. 7 is a schematic view showing the arrangement of an eyepiece according to a fourth embodiment of the present invention.

As the fourth embodiment of the present invention, FIG. 7 shows an eyepiece which has an apparent visual angle of 56°, and has a four-group/six-lens arrangement comprising, in the following order from the eyepoint (E.P.) side, a first lens group $G_{41}$ including a cemented lens of a negative lens $L_{41}$ and a positive lens $L_{42}$ and having a positive refractive power, a second lens group $G_{42}$ including a single positive lens component $L_{43}$, a third lens group $G_{43}$ including a cemented lens of a positive lens $L_{44}$ and a negative lens $L_{45}$ and having a positive refractive power, and a fourth lens group $G_{44}$ including a single negative lens component $L_{46}$. In this embodiment, the lens material of the negative lens $L_{46}$ in the fourth lens group $G_{44}$ is a resin optical material, and a lens surface $R_{50}$ on the object side is an aspherical surface which is expressed by formula (1) above and satisfies conditional formulas (3), (5), and (7) above.

Table 5 below shows the parameter values of the eyepiece of this embodiment. In Table 5, $r_i$ is the radius of curvature of a lens surface $R_i$, $d_i$ is the surface interval on the optical axis between lens surfaces $R_i$ and $R_{i+1}$, $n_i$ is the refractive index for the d-line of a medium between lens surfaces $R_i$ and $R_{i+1}$, and $v_i$ is the Abbe's number of a medium between lens surfaces $R_i$ and $R_{i+1}$. Table 5 also shows the aspherical surface coefficients $C_4$, $C_6$, $C_8$, and $C_{10}$, and $\kappa$.

TABLE 5

| $R_i$ | $r_i$ | $d_i$ | $n_i$ | $v_i$ |
|---|---|---|---|---|
| $R_{41}$ | −145.9 | 2.0 | 1.805 | 25.5 |
| $R_{42}$ | 36.7 | 8.0 | 1.713 | 53.9 |
| $R_{43}$ | −21.6 | 0.2 | | |
| $R_{44}$ | 50.0 | 4.5 | 1.713 | 53.9 |
| $R_{45}$ | −70.0 | 0.2 | | |
| $R_{46}$ | 19.5 | 7.5 | 1.620 | 60.4 |
| $R_{47}$ | −54.0 | 2.0 | 1.805 | 25.5 |
| $R_{48}$ | 32.8 | 3.5 | | |
| $R_{49}$ | −29.5 | 1.5 | 1.491 | 57.6 |
| $R_{50}$ | 60.0 | | | |

Figures 8A, 8B, 8C:
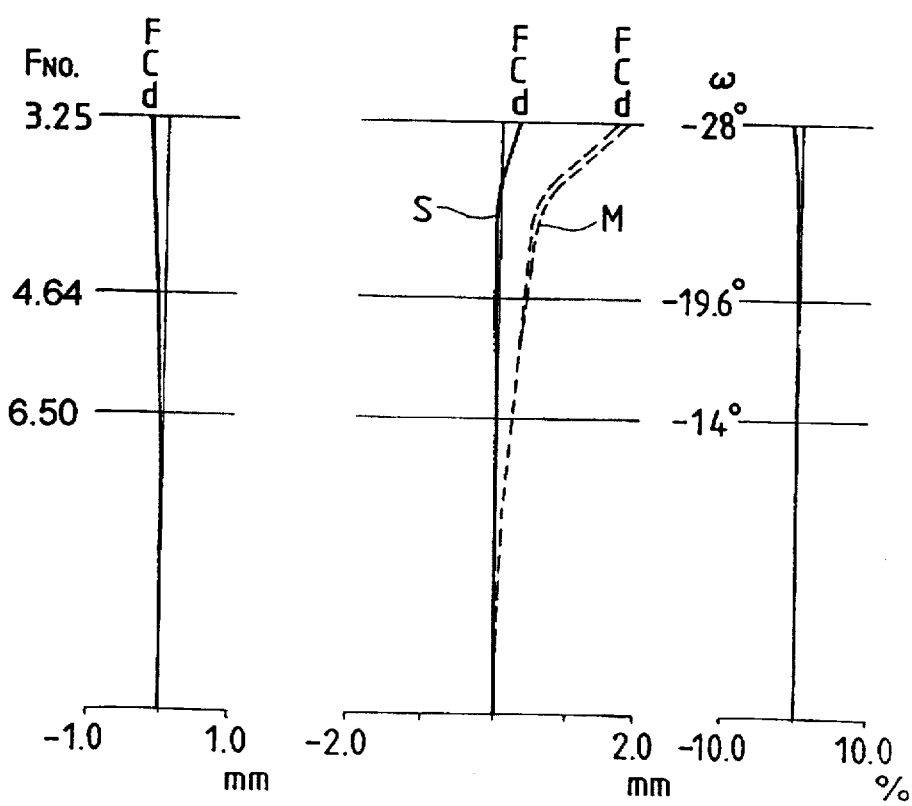
Figure 9A:
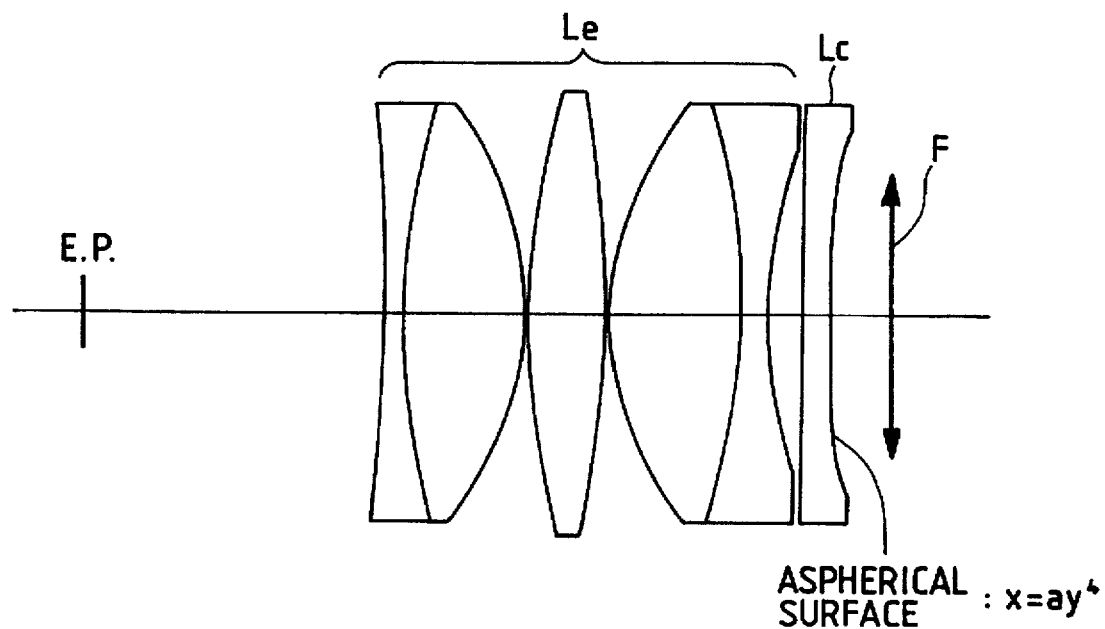
Figure 9B:
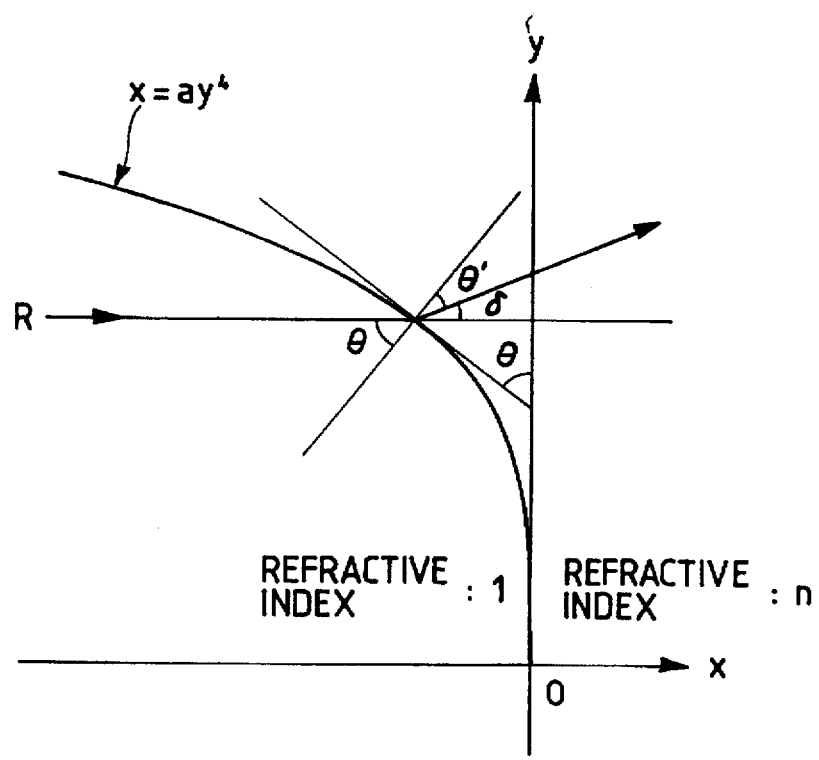

$R_{50}$: aspherical surface
$\kappa = -5.00$
$C_4 = 0.23 \times 10^{-5}$
$C_6 = 0.42 \times 10^{-7}$
$C_8 = 0.13 \times 10^{-8}$
$C_{10} = -0.45 \times 10^{-10}$
$S_2 = 0.341$
$|dx/h| = 0.0012$ In this embodiment, the synthesized focal length of the four lens groups is f=16.25 mm, the value $|dx/h|$ corresponding to conditional formula (5) and the value $S_2$ corresponding to conditional formula (7) are as shown in Table 5 above. Various aberrations of the eyepiece of this embodiment (the same aberration curves as in FIGS. 2A to 2C) are as shown in FIGS. 8A to 8C. The eye relief of this eyepiece is 19.4 mm, and is prolonged by about 20% as compared to the conventional eyepiece (FIG. 10) in which the eye relief is substantially equal to the synthesized focal length. As is apparent from FIGS. 8A to 8C, in the eyepiece of this embodiment, the distortion is especially greatly improved as compared to a conventional eyepiece using no aspherical surface.

In each of the above embodiments, the eyepiece has an apparent visual angle of 56°. However, the eyepiece of the present invention can maintain sufficient optical performance up to a visual angle of about 70° if it does not care about an increase in the size of the lens system.

As described above, according to the present invention, in the eyepiece having an apparent visual angle of 40° or more, at least one lens surface in the lens groups is formed as an aspherical surface expressed by formula (1), and the value of the fourth-order aspherical surface coefficient $C_4$ satisfies conditional formula (2), and also conditional formula (3), thereby satisfactorily correcting the distortion.

Furthermore, when the aspherical surface is used in the positive lens component, the aspherical surface shape is set to be satisfy conditional formula (4); when the aspherical surface is used in the positive lens component, the aspherical surface shape is set to be satisfy conditional formula (5), thus satisfactorily correcting the distortion.

As the lens surface formed as the aspherical surface, the single lens, i.e., one of the positive lens component in the second lens group and the negative lens component in the fourth lens group is selected, thus obtaining a high-precision aspherical surface without causing a manufacturing error due to the cemented surfaces or the like. Furthermore, when the aspherical surface is arranged in the second lens group, the aspherical surface shape is set to satisfy conditional formula (6); when the aspherical surface is arranged in the fourth lens group, the aspherical surface shape is set to satisfy conditional formula (7), thereby satisfactorily correcting various aberrations, i.e., the astigmatism, distortion, and coma.

What is claimed is:

1. An eyepiece, which has an apparent visual angle of not less than 40°, comprising, in the following order from the eyepoint side:

a first lens group including a cemented lens of negative and positive lens components and having a positive refractive power;

a second lens group including a single positive lens component;

a third lens group including a cemented lens of positive and negative lens components and having a positive refractive power; and a fourth lens group including a single negative lens component, wherein at least one surface in said first to fourth lens groups is an aspherical surface whose peripheral portion has a radius of curvature larger than a radius of curvature near a vertex thereof, and wherein said aspherical surface satisfies the following formulas:

$$x = C_0 y^2 / [1 + \sqrt{(1 - \kappa C_0^2 y^2)}] + C_4 y^4 + C_6 y^6 + C_8 y^8 + C_{10} y^{10}$$

$$|C_4| \leq 1 \times 10^{-3}$$

where x is the distance measured from the vertex in an optical axis direction, y is the distance measured from the vertex in a direction perpendicular to the optical axis, $C_0 = 1/R$ (radius of curvature at the vertex) is the vertex curvature, $\kappa$ is a constant of cone, and $C_4$, $C_6$, $C_8$, and $C_{10}$ are respectively 4th-, 6th-, 8th-, and 10th-order aspherical surface coefficients.

2. An eyepiece according to claim 1, wherein the aspherical surface coefficient $C_4$ satisfies the following formula:

$$1 \times 10^{-7} < |C_4| < 1 \times 10^{-3}.$$

3. An eyepiece, which has an apparent visual angle of not less than 40°, comprising, in the following order from the eyepoint side:

a first lens group including a cemented lens of negative and positive lens components and having a positive refractive power;

a second lens group including a single positive lens component;

a third lens group including a cemented lens of positive and negative lens components and having a positive refractive power; and a fourth lens group including a single negative lens component, wherein at least one surface of the lens components having positive refractive power in said first to fourth lens groups is an aspherical surface, and said aspherical surface satisfies the following formula:

$$5\times10^{-3} < \mathrm{d}x/h < 5\times10^{-2}$$

where dx is the displacement amount from an incident position of a principal ray with a maximum incident height onto said aspherical surface to an incident position onto an imaginary reference spherical surface, which is measured in the optical axis direction, and h is the distance from the optical axis of the incident position of the principal ray with the maximum incident height.

4. An eyepiece lens according to claim 3, wherein at least one of a lens surface on the eyepoint side and a lens surface on the object side of said positive lens component in said second lens group is said aspherical surface, and said aspherical surface satisfies the following formula:

$$-1 < S_1 < 0$$

for $S_1 = (r_b + r_a)/(r_b - r_a)$ where $r_a$ is the radius of curvature at the vertex of the lens surface on the eyepoint side, and $r_b$ is the radius of curvature at the vertex of the lens surface on the object side.

5. An eyepiece, which has an apparent visual angle of not less than 40°, comprising, in the following order from the eyepoint side:

a first lens group including a cemented lens of negative and positive lens components and having a positive refractive power;

a second lens group including a single positive lens component;

a third lens group including a cemented lens of positive and negative lens components and having a positive refractive power; and a fourth lens group including a single negative lens component, wherein at least one surface of the lens components having a negative refractive power in said first to fourth lens groups is an aspherical surface, and said aspherical surface satisfies the following formula:

$$5\times10^{-4} < \mathrm{d}x/h < 5\times10^{-2}$$

where dx is the displacement amount from an incident position of a principal ray with a maximum incident height onto said aspherical surface to an incident position onto an imaginary reference spherical surface, which is measured in the optical axis direction, and h is the distance from the optical axis of the incident position of the principal ray with the maximum incident height.

6. An eyepiece lens according to claim 5, wherein at least one of a lens surface on the eyepoint side and a lens surface on the object side of said negative lens component in said fourth lens group is said aspherical surface, and said aspherical surface satisfies the following formula:

$$-1 < S_2 < 1$$

for $S_2 = (r_d + r_c)/(r_d - r_c)$ where $r_c$ is the radius of curvature at the vertex of the lens surface on the eyepoint side, and $r_d$ is the radius of curvature at the vertex of the lens surface on the object side.

7. An eyepiece lens, which has an apparent visual angle of not less than 40°, comprising, in the following order from the eyepoint side:

a first lens group including a cemented lens of negative and positive lens components and having a positive refractive power;

a second lens group including a single positive lens component;

a third lens group including a cemented lens of positive and negative lens components and having a positive refractive power; and a fourth lens group including a single negative lens component, wherein at least one surface in said first to fourth lens groups is an aspherical surface whose peripheral portion has a radius of curvature larger than a radius of curvature near a vertex thereof, and wherein at least one of a lens surface on the eyepoint side and a lens surface on the object side of said positive lens component in said second lens group is said aspherical surface, and said aspherical surface satisfies the following formula:

$$-1 < S_1 < 0$$

for $S_1 = (r_b + r_a)/(r_b - r_a)$ where $r_a$ is the radius of curvature at the vertex of the lens surface on the eyepoint side, and $r_b$ is the radius of curvature at the vertex of the lens surface on the object side.

8. An eyepiece lens, which has an apparent visual angle of not less than 40°, comprising, in the following order from the eyepoint side:

a first lens group including a cemented lens of negative and positive lens components and having a positive refractive power;

a second lens group including a single positive lens component;

a third lens group including a cemented lens of positive and negative lens components and having a positive refractive power; and a fourth lens group including a single negative lens component, wherein at least one surface in said first to fourth lens groups is an aspherical surface whose peripheral portion has a radius of curvature larger than a radius of curvature near a vertex thereof, and wherein at least one of a lens surface on the eyepoint side and a lens surface on the object side of said negative lens component in said fourth lens group is said aspherical surface, and said aspherical surface satisfies the following formula:

$$-1 < S_2 < 1$$

for $S_2 = (r_d + r_c)/(r_d - r_c)$ where $r_c$ is the radius of curvature at the vertex of the lens surface on the eyepoint side, and $r_d$ is the radius of curvature at the vertex of the lens surface on the object side.

* * * * *